United States Patent
Kato et al.

(10) Patent No.: US 8,995,028 B2
(45) Date of Patent: Mar. 31, 2015

(54) READING APPARATUS

(71) Applicant: Canon Kabushiki Kaisha, Tokyo (JP)

(72) Inventors: Hiroshi Kato, Odawara (JP); Ichiro Yasumaru, Mishima (JP); Atsushi Ogata, Mishima (JP); Kazushi Ino, Suntou-gun (JP); Tomoyuki Iwakoshi, Suntou-gun (JP); Daisuke Kaneko, Suntou-gun (JP); Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/886,492

(22) Filed: May 3, 2013

(65) Prior Publication Data

US 2013/0293937 A1 Nov. 7, 2013

(30) Foreign Application Priority Data

May 7, 2012 (JP) .................. 2012-105895

(51) Int. Cl.
*H04N 1/04* (2006.01)
*H04N 1/00* (2006.01)
*H04N 1/12* (2006.01)

(52) U.S. Cl.
CPC ....... *H04N 1/00572* (2013.01); *H04N 1/00575* (2013.01); *H04N 1/00586* (2013.01);
(Continued)

(58) Field of Classification Search
CPC .......... H04N 1/193; H04N 2201/0081; H04N 1/2032; H04N 1/00602; H04N 1/12; H04N 1/00578; H04N 1/00572; H04N 1/00588; H04N 1/0058; H04N 1/121; H04N 2201/0091; H04N 1/00612; H04N 1/0071

USPC .......... 358/498, 474, 496, 497, 486; 399/374, 399/367, 364, 110, 126, 306, 311, 373; 271/3.14, 10, 162, 186, 225, 264, 314, 271/4.1, 198, 207, 258.01
See application file for complete search history.

(56) References Cited

U.S. PATENT DOCUMENTS 5,055,946 A    10/1991   Kurahashi et al.
7,414,764 B2 *  8/2008   Shyu ............................ 358/498
(Continued)

FOREIGN PATENT DOCUMENTS

JP    6-30257 A1    2/1994
JP    6-164818 A    6/1994
(Continued)

*Primary Examiner* — Negussie Worku
(74) *Attorney, Agent, or Firm* — Canon USA Inc IP Division

(57) ABSTRACT

A reading apparatus including:
 a first conveyance path in which a sheet is conveyed;
 a second conveyance path different from the first conveyance path, the second conveyance path allowing the sheet switched back after having passed through the first conveyance path to be conveyed therein;
 a reading unit configured to read the sheet, the reading unit being movable to a first position where a first surface of the sheet in the first conveyance path is read, a second position where a second surface as a back surface of the first surface of the sheet in the second conveyance path is read, and a third position different from the first position and the second position; and
 a reference portion that the reading unit reads for correcting information read by the reading unit, the reference portion being read by the reading unit moved to the third position.

17 Claims, 9 Drawing Sheets

(52) U.S. Cl.
CPC ....... *H04N1/00596* (2013.01); *H04N 1/00602* (2013.01); *H04N 1/00612* (2013.01); *H04N 1/125* (2013.01)
USPC ............ 358/474; 358/498; 399/367; 271/114

(56) References Cited

U.S. PATENT DOCUMENTS

| | | | |
|---|---|---|---|
| 7,477,427 B2 * | 1/2009 | Fujikawa et al. ............. | 358/474 |
| 7,511,864 B2 * | 3/2009 | Muzzin et al. ................ | 358/496 |
| 7,623,277 B2 * | 11/2009 | Wang et al. ................... | 358/498 |
| 7,746,523 B2 * | 6/2010 | Kim ............................... | 358/498 |
| 7,791,771 B2 * | 9/2010 | Shiraishi ....................... | 358/475 |
| 7,847,982 B2 * | 12/2010 | Mizumukai ................... | 358/400 |
| 7,876,479 B2 * | 1/2011 | Jo .................................. | 358/498 |
| 7,924,481 B2 * | 4/2011 | Kim ............................... | 358/496 |
| 8,072,653 B2 | 12/2011 | Iwata et al. | |
| 8,144,377 B2 * | 3/2012 | Wang et al. .................... | 358/498 |
| 8,218,158 B2 | 7/2012 | Kawazoe et al. | |
| 8,498,027 B2 * | 7/2013 | Jo .................................. | 358/498 |
| 2014/0045685 A1 * | 2/2014 | Iguchi et al. .................. | 503/201 |

FOREIGN PATENT DOCUMENTS

| | | |
|---|---|---|
| JP | 8-237452 A | 9/1996 |
| JP | 10-126567 A1 | 5/1998 |
| JP | 2000-185881 A | 7/2000 |
| JP | 2004-180146 A | 6/2004 |
| JP | 2005-89151 A | 4/2005 |
| JP | 2006-232467 A | 9/2006 |

* cited by examiner

READING APPARATUS

BACKGROUND OF THE INVENTION

1. Field of the Invention

The present invention relates to a reading apparatus configured to read a sheet for example an original represented by an auto document feeder unit (hereinafter referred to as ADF).

2. Description of the Related Art

A configuration in which reading units (image sensors) arranged respectively at positions in an original conveyance path opposing a front surface and a back surface of an original in order to read both surfaces (the front surface and the back surface) of the original automatically by the image reading apparatus as described above is generally known. However, in this configuration, reading sensors for the front surface and the back surface of the original need to be provided, and cost increases may result.

Accordingly, in Japanese Patent Laid-Open No. 10-126567, the reading unit is configured to be capable of moving in a main body of an apparatus so as to be capable of reading the originals in a plurality of conveyance paths by a single reading sensor.

Japanese Patent Laid-Open No. 6-30257 describes providing a reference portion as a white reference plate at a position facing the reading unit with the conveyance path of the original interposed therebetween for reading the original accurately, and correcting information read by the reading unit such as shading correction by sensing the provided reference portion.

However, in a configuration in which the reading unit moves such as that disclosed in Japanese Patent Laid-Open No. 10-126567, how the reference portion is arranged is not disclosed.

In the configuration in which the reference portion is arranged on the conveyance path as in Japanese Patent Laid-Open No. 6-30257, there is a case where the original comes into contact with the reference portion and hence foreign substances such as paper dust adhere to the reference portion or the reference portion is scratched by the original, so that the state of the reference portion may be changed by being scrubbed and hence damaged by the original when the original passes through the position facing the reading unit. In this manner, due to soiling or scratches of the reference portion, adequate correction relating to information read by the reading unit may not be performed.

SUMMARY OF THE INVENTION

The invention reduces the probability of soiling or scratches of a reference portion in a configuration in which originals in a plurality of conveyance paths can be read by a single reading unit.

The invention provides an image reading apparatus as described below.

An image reading apparatus includes:
 a first conveyance path in which a sheet is conveyed; a second conveyance path different from the first conveyance path, the second conveyance path allowing the sheet switched back after having passed through the first conveyance path to be conveyed therein;
 an image reading unit configured to read an image of the sheet, the image reading unit being movable to a first position where an image of a first surface of the sheet in the first conveyance path is read, a second position where an image of a second surface as a back surface of the first surface of the sheet in the second conveyance path is read, and a third position different from the first position and the second position; and
 a reference portion that the image reading unit reads for correcting information read by the image reading unit, the reference portion being read by the image reading unit moved to the third position.

An image reading apparatus includes:
 an image reading unit configured to be movable to a first position where an image of a first surface of a sheet is read, a second position where an image of a second surface as a back surface of the first surface of the sheet is read, and a third position different from the first position and the second position; and
 a surface to be sensed read by the image reading unit for correcting information read by the image reading unit, the surface to be sensed being arranged so as to face downward in the vertical direction, and the surface to be sensed is read by the image reading unit moved to the third position.

Further features of the present invention will become apparent from the following description of exemplary embodiments with reference to the attached drawings.

DESCRIPTION OF THE EMBODIMENTS

First Embodiment

Figure 1:
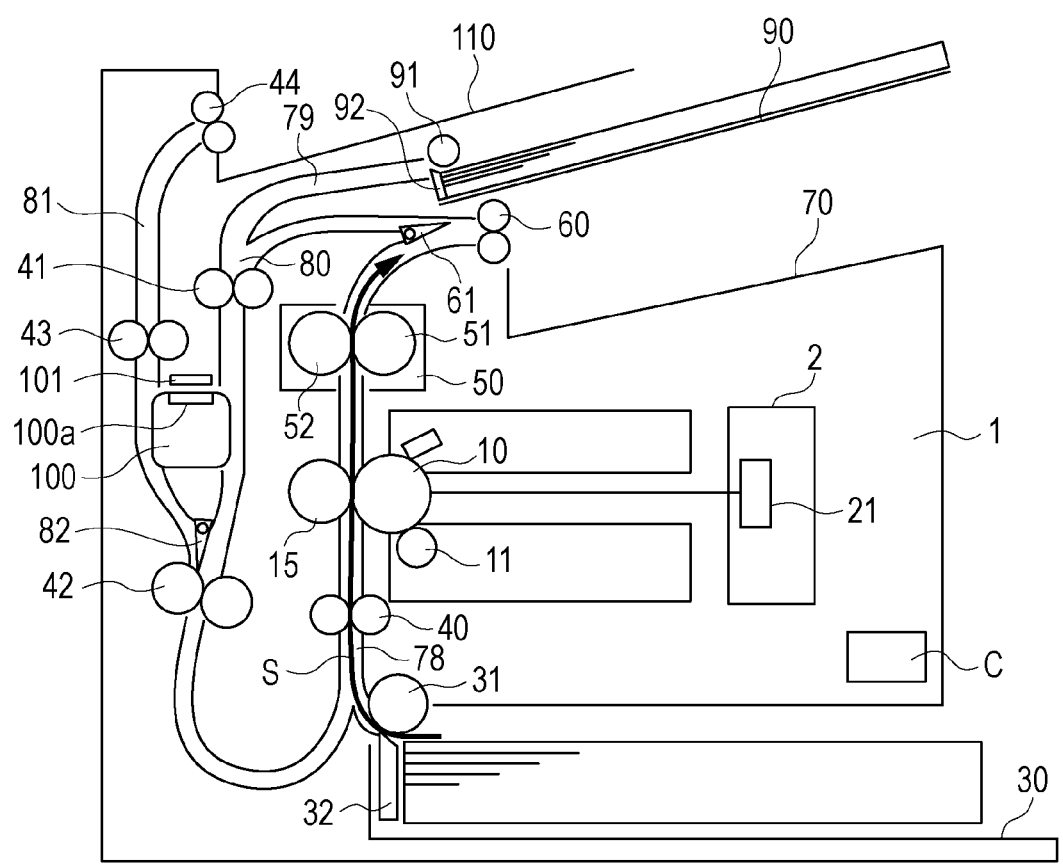
FIG. 1 is a schematic cross-sectional view of an image reading apparatus.

In a first embodiment, an image reading apparatus to which the invention is applied will be described. FIG. 1 is a schematic cross-sectional view of an image reading apparatus 1. The image reading apparatus 1 of the first embodiment includes an image forming device functioning as an image forming apparatus, described later, and may be considered as an image forming apparatus having an image reading apparatus.

First of all, a schematic configuration of the image reading apparatus 1 will be described. In the image reading apparatus 1, a conveyance path 78 configured to convey a recording paper S (sheet) from a first paper feed unit 30 arranged below the image reading apparatus 1 to a first paper discharge unit 70 arranged above the image reading apparatus 1 is arranged. In the image reading apparatus 1, a duplex conveyance path 80 configured to convey the recording paper S switched back at the time of duplex print and convey the recording paper S again to the conveyance path 78, and a first original conveyance path 79 configured to convey an original G (sheet) from a second paper feed unit 90 arranged above the image reading apparatus 1 to the duplex conveyance path 80. In addition, in the image reading apparatus 1, a second original conveyance path 81 for conveying the original G switched back in the duplex conveyance path 80 to a second paper discharge unit 110 arranged above the image reading apparatus 1 is provided.

The image reading apparatus 1 includes a rotatable photoconductive drum 10 as an image carrying member and a developing roller 11 configured to come into contact with the photoconductive drum 10 and rotate with toner retained thereon at a center portion of thereof. An optical unit 2 configured to irradiate a laser beam is arranged so as to face the photoconductive drum 10. A transfer roller 15 is provided at a position facing the photoconductive drum 10 with the first original conveyance path 79 interposed therebetween. A fixing unit 50 is provided on the downstream side of the first original conveyance path 79 with respect to the transfer roller 15 in the direction of conveyance.

Image Forming Device

The first paper feed unit 30, the conveyance path 78, the photoconductive drum 10, the developing roller 11, the optical unit 2, the fixing unit 50, the first paper discharge unit 70, and the duplex conveyance path 80 described above function as an image forming device for forming an image on the sheet-like recording paper S.

Figure 2:
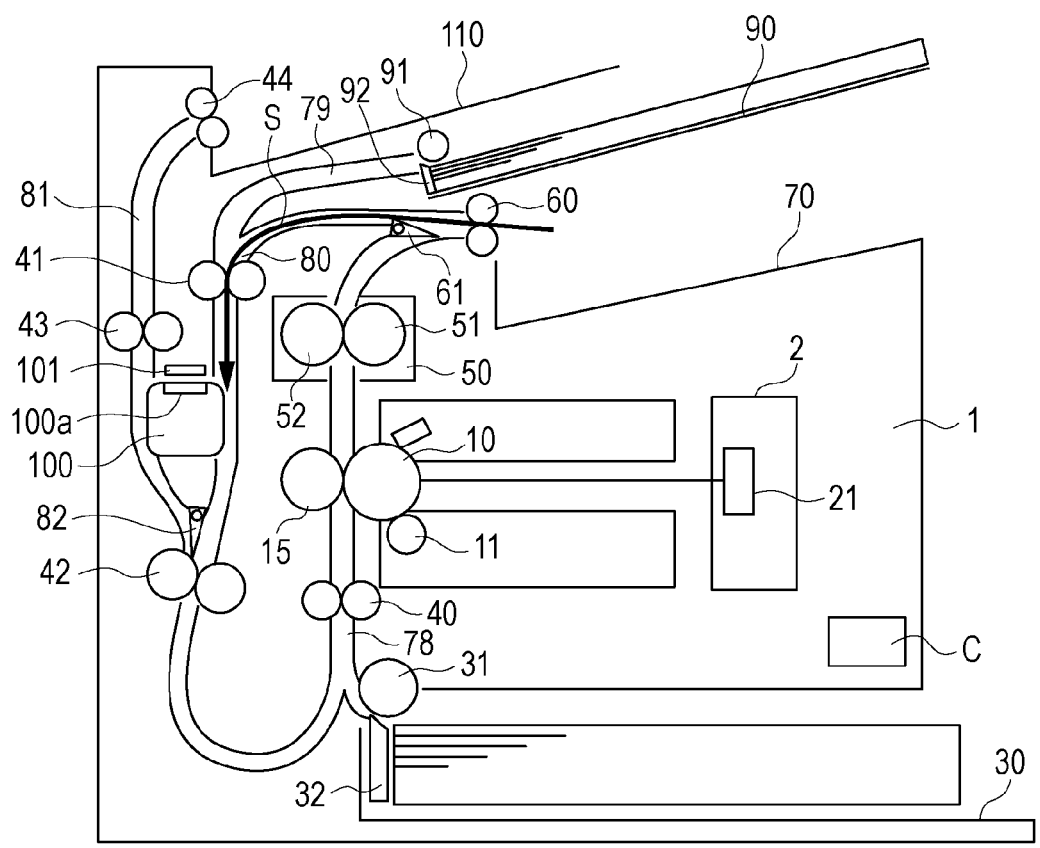
FIG. 2 is a schematic cross-sectional view of the image reading apparatus.

Subsequently, an image forming operation by the image forming device will be described with reference to FIGS. 1 and 2. FIG. 2 is also a schematic cross-sectional view of the image reading apparatus 1. The image forming device starts the image forming operation by receiving a printing signal. The image forming operation is as follows. A light-emitting portion 21 provided in the optical unit 2 is charged on the surface thereof by a charging device, not illustrated, and irradiates the surface of the rotatable photoconductive drum 10 with a laser beam according to image information to be printed thereon, the surface of the photoconductive drum 10 irradiated with the laser beam is formed with a latent image according to the image information to be printed. When the developing roller 11 transfers the toner retained thereon to the surface of the photoconductive drum 10 while rotating, a toner image corresponding to the latent image is formed on the surface of the photoconductive drum 10.

In contrast, the recording paper S stored in the first paper feed unit 30 is conveyed one by one to a conveyance path 40 by a pickup roller 31 and a separating device 32. The conveyance path 40 conveys the recording paper S to the transfer roller 15 so that the toner image on the surface of the photoconductive drum 10 and the position of a leading edge of the recording paper S are timed.

The toner image formed on the surface of the photoconductive drum 10 moves to a position of a transfer nip facing the transfer roller 15 by the rotation of the photoconductive drum 10, and is transferred to the recording paper S by a transfer bias applied to the transfer roller 15. The recording paper S to which the toner image is transferred is conveyed to the fixing unit 50, passes through a fixing nip between a heating roller 51 and a pressing roller 52, thereby being heated and pressed, and the toner image is fixed to the recording paper S. The recording paper S on which the toner image is fixed is transferred to the downstream side of the fixing unit 50 by a discharge roller 60.

Here, in the case of simplex print that performs printing only on one surface of the recording paper S, the discharge roller 60 transfers the recording paper S to the outside of the machine as is, and discharges the recording paper S onto the first paper discharge unit 70.

In the case of the duplex print that performs printing on the both surfaces of the recording paper S, the following operation is performed. FIG. 2 is a schematic cross-sectional view of the image reading apparatus 1, and is an explanatory drawing for explaining the duplex printing operation. The recording paper S conveyed to the downstream side of the fixing unit 50 is conveyed to a position where a trailing edge of the recording paper S passes the position of a flapper 61 by the discharge roller 60. The flapper 61 configured to pivot for switching the conveyance path of the recording paper S pivots downward and switches the conveyance path after the trailing edge of the recording paper S having passed through the fixing unit has passed through the position of the flapper 61. Thereafter, the discharge roller 60 rotates in the reverse direction, and the recording paper S is conveyed to the duplex conveyance path 80 with the trailing edge now as a leading edge. This is so-called a switchback.

The switched back recording paper S is conveyed by the conveyance rollers 41, 42 and 40 and is conveyed to the transfer roller 15 again. Thereafter, the transfer and fixation of the toner image on another surface of the recording paper S by the image forming operation described above, and the recording paper S is discharged to the first paper discharge unit 70. With the image forming operation as described above, image formation on one surface or both surfaces of the recording paper S is performed.

Image Reading Device

Part of the image reading apparatus 1 of the first embodiment is shared with the image forming device, and the image reading apparatus 1 includes an image reading device configured to function as an image reading apparatus configured to read the image on a sheet type original. Specifically, the second paper feed unit 90, the first original conveyance path 79, the duplex conveyance path 80, the second original conveyance path 81, a flapper 82, the conveyance rollers 42 and 43, a reading unit 100, and a white reference member 101 as a reference portion are included. From among the members described above, the duplex conveyance path 80 is a shared portion functioning also as the image forming device.

Figure 9:
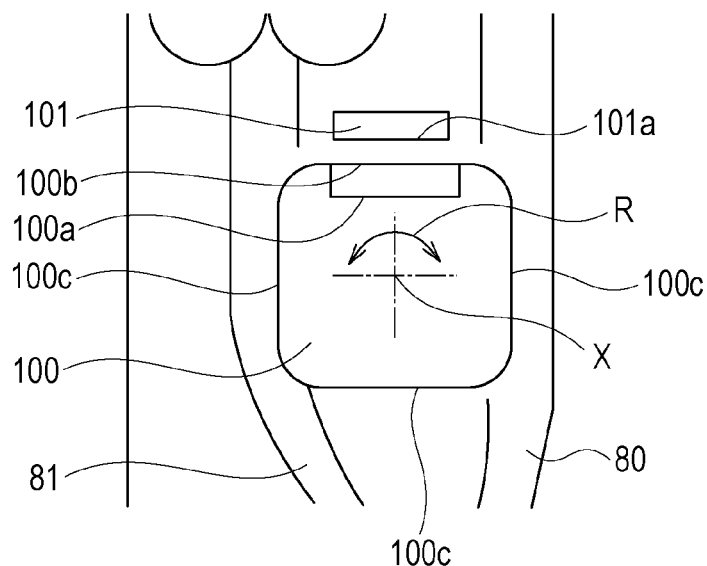
FIG. 9 is a schematic cross-sectional view of a portion near a reading unit of the image reading apparatus.

FIG. 9 is a schematic cross-sectional view of a portion near the reading unit of the image reading apparatus 1. The reading unit (image reading unit) 100 includes a light-emitting portion, not illustrated, configured to irradiate the original with light, and a reading surface 100b facing the original, and includes a glass 100a configured to allow light from the light-emitting portion to pass therethrough, a light receiving portion, not illustrated, configured to receive a reflected light from the original coming through the glass 100a, and the glass 100a and the light receiving portion are formed integrally so as to be movable. The light receiving portion includes a plurality of photoelectric transducers arranged in a direction orthogonal to the direction of conveyance of the original. The reading unit 100 senses the amount of received light of reflected light from the original at the light-receiving portion, and outputs a signal corresponding to the sensed amount of received light to an image control unit C as image information of the read original. In this manner, the image of the original can be read.

The reading unit 100 is rotatable about an axis X as illustrated by an arrow R in FIG. 1, and is capable of being moved to a position where the image on a first surface of the original in the duplex conveyance path (first conveyance path) 80 is read (first position) and a position where the image on a second surface of the original in the second original conveyance path (second conveyance path) 81 (second position). At the first position and the second position, the reading surface 100b faces the surface of the original to be read. Although detail description will be given later, the reading unit 100 is provided with a guide portion 100c configured to guide the conveyance of the sheet conveyed in the duplex conveyance path 80 or the second original conveyance path 81.

The reading unit 100 is at a stand-by position (third position) between the two positions described above in a state in which the original is not read. In the first embodiment, a surface to be sensed 101a of the white reference member 101 is arranged vertically above the reading unit 100 at the stand-by position, and the reading surface 100b of the reading unit 100 faces the surface to be sensed 101a of the white reference member 101 so as to be capable of reading the surface to be sensed 101a. The surface to be sensed 101a is arranged so as to face downward in the vertical direction. Information obtained by reading the surface to be sensed 101a of the white reference member 101 is set as white reference information, so that information relating to the image of the original read may be corrected on the basis of this information. Such a correction on the information relating to the image of the original may be performed by the image control unit C on the basis of the white reference information, and may be performed by correcting the information by the reading unit 100 on the basis of the white reference information and outputting the corrected information to the image control unit C as the image information of the original.

The image control unit C is capable of forming an image on the basis of the image information by transmitting the image information output from the reading unit to an information processing apparatus or a memory apparatus such as an external PC or a server, and a USB memory via a network or the like, or transmitting to the image forming device. It is also possible to store the image information in a memory (storage device) provided in the image control unit C. The memory provided in the image control unit C indicates not only a memory on the same substrate platform as the image control unit C, and also a memory provided on another substrate platform as long as being provided in the image reading apparatus 1.

Image Reading Operation

Figure 3:
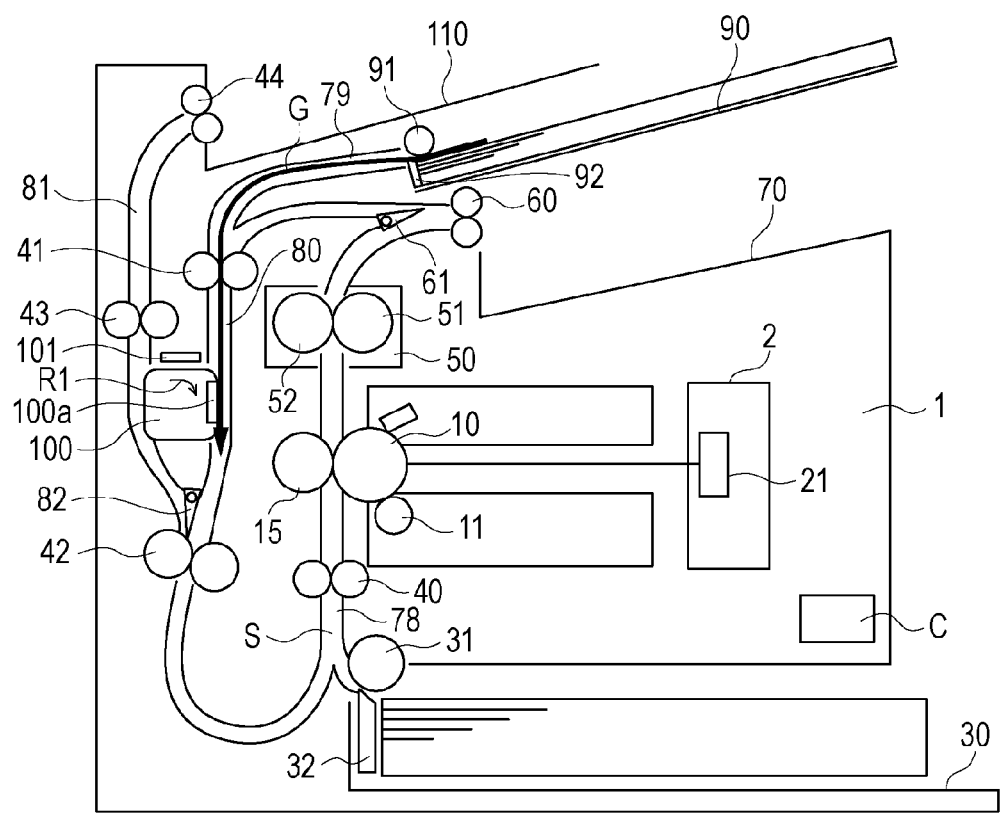
FIG. 3 is a schematic cross-sectional view of the image reading apparatus.

Subsequently, an image information reading operation for reading the original G by the image reading device will be described. FIG. 3 is an explanatory drawing illustrating a state at the time of starting reading of the front surface of the original. The original G stored in the second paper feed unit 90 is conveyed to the duplex conveyance path 80 via the first original conveyance path 79 to the conveyance rollers 41 one by one by a pickup roller 91 and a separating device 92.

In contrast, the reading unit 100 emits light to the white reference member 101 at the stand-by position and read the information of the white reference member 101 until the reading of the first surface, which is a front surface of the original, fed from the second paper feed unit 90 is started, and performs the correction of the white reference information. Then, the reading unit 100 turns in a direction R1, and moves to the first position facing the duplex conveyance path 80.

When the original G conveyed in the duplex conveyance path 80 passes through a position facing the reading unit 100 located at the first position, the reading unit 100 irradiates the first surface of the original G with light to read the image information. The image information corresponding to the first surface of the read original G is transmitted to the image control unit C.

Figure 4:
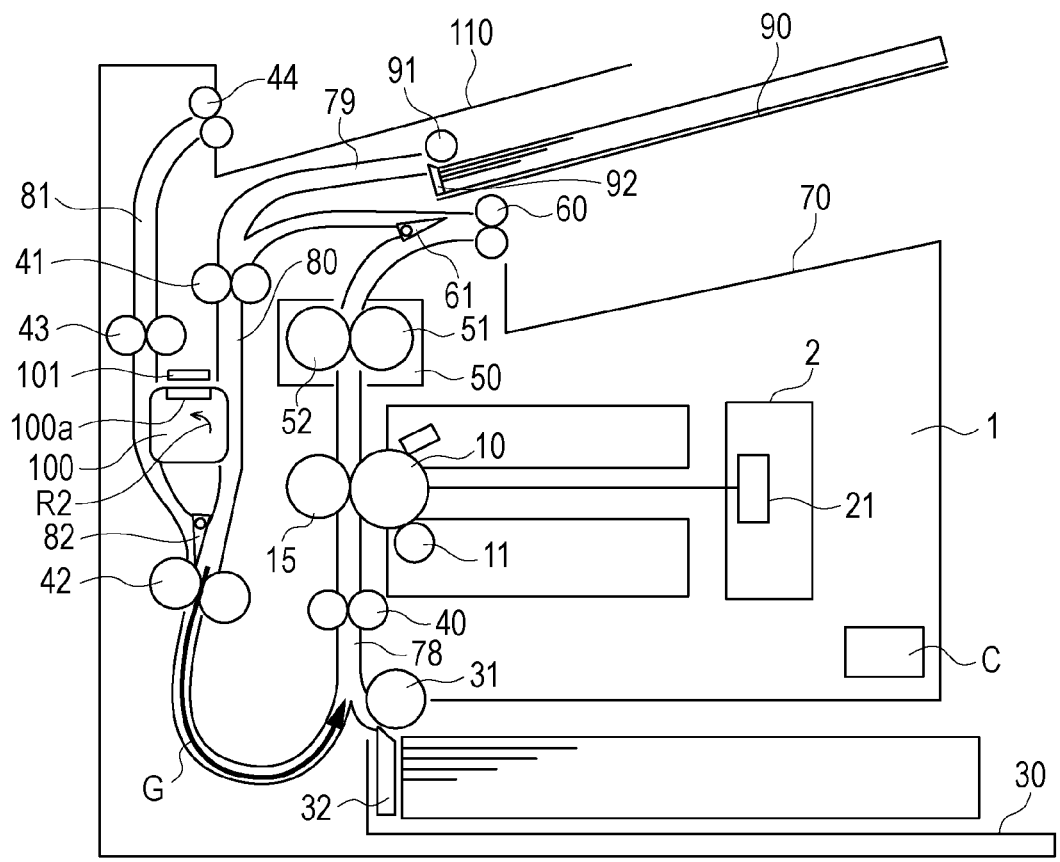
FIG. 4 is a schematic cross-sectional view of the image reading apparatus.
Figure 5:
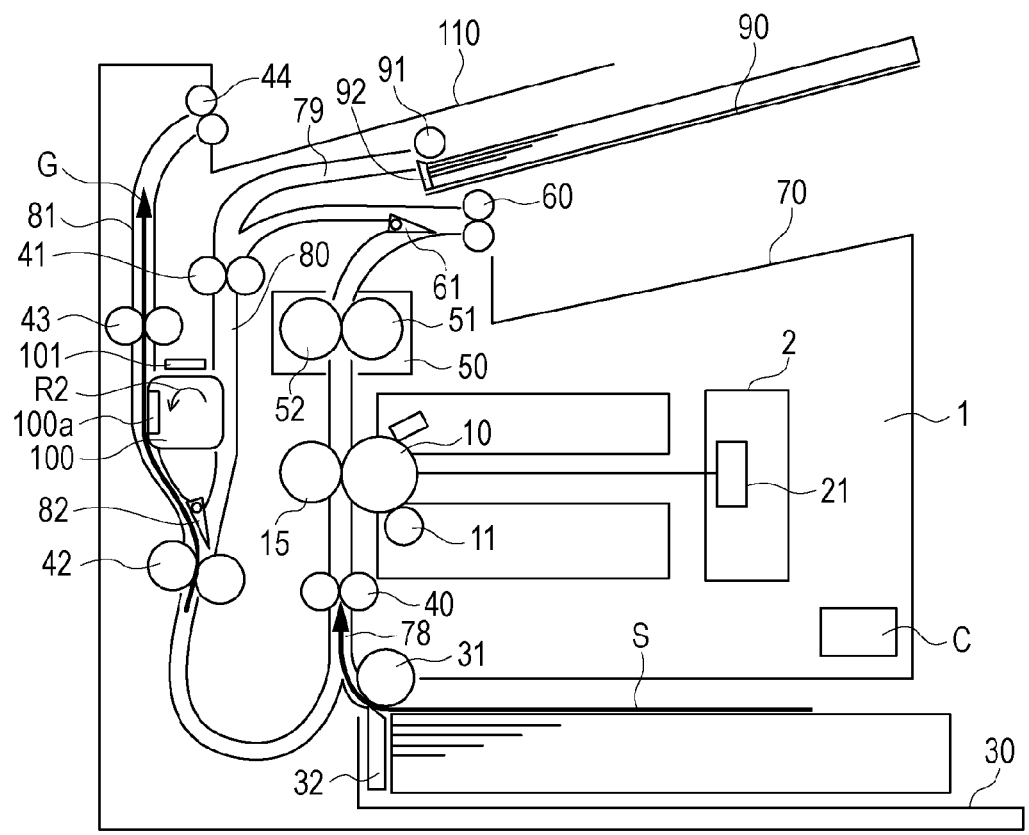
FIG. 5 is a schematic cross-sectional view of the image reading apparatus.

The original G passed through the position of the reading unit 100 is conveyed further through the duplex conveyance path 80 by the conveyance rollers 42 and, as illustrated in FIG. 4, is stopped at a position where the trailing edge of the original G passes through the leading edge of the flapper 82. At this time, the original G is stopped in a state of being nipped by the conveyance rollers 42. Then, after the elapse of a predetermined time, the conveyance rollers 42 rotates in the reverse direction as illustrated in FIG. 5, and hence the original G is switched back (the conveyance in which the leading edge and the trailing edge of the original G is reversed), is guided by the flapper 82, and is conveyed in the second original conveyance path 81.

In contrast, the reading unit 100 reads the first surface of the original G, then rotates in a direction R2 and moves to the stand-by position, reads the white reference member 101 again, and performs the correction of the white reference information as illustrated in FIG. 4. Then, as illustrated in FIG. 5, the reading unit 100 rotates further in the direction R2, and moves to the second position facing the second original conveyance path 81.

Figure 6:
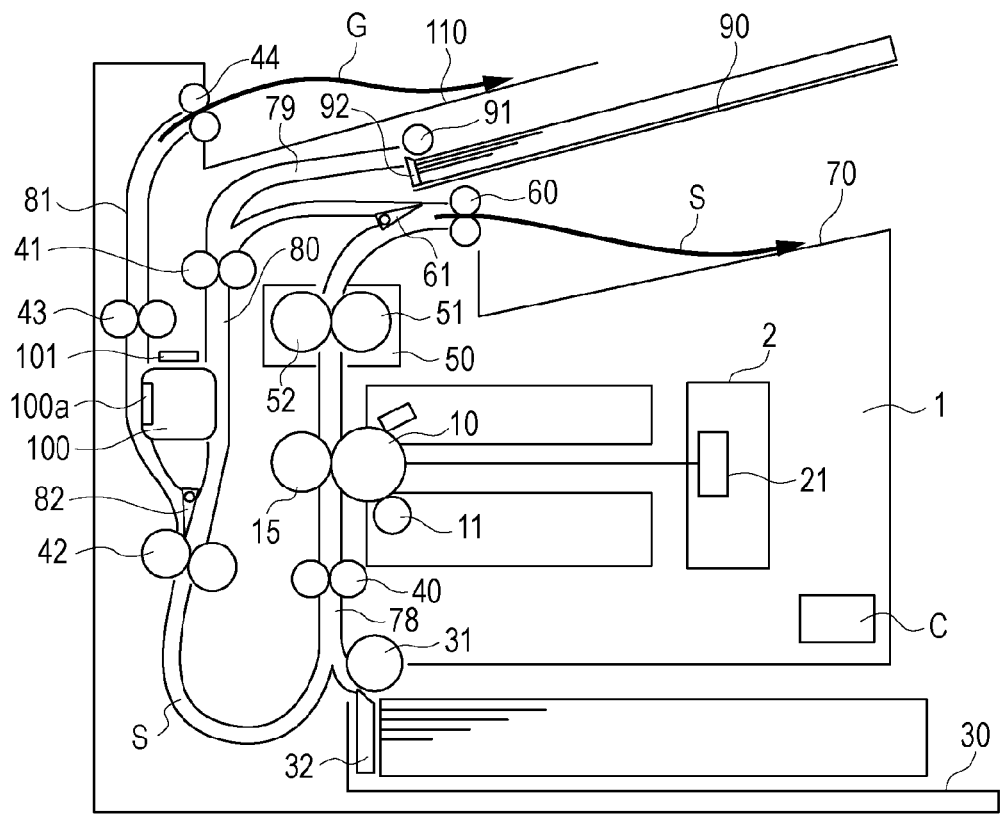
FIG. 6 is a schematic cross-sectional view of the image reading apparatus.

Then, when the original G conveyed in the second original conveyance path 81 passes through the position facing the reading unit 100 located at the second position, the reading unit 100 irradiates the second surface of the original G with light and reads the image information. The image information corresponding to the second surface of the read original G is transmitted to the image control unit C. The original G read over the first surface and the second surface is transferred to the conveyance rollers 43 and 44 as illustrated in FIG. 6, and is loaded on the second paper discharge unit 110. In this manner, the both surfaces (the first surface and the second surface) of the original G may be read by the single reading unit 100.

Subsequently, a case of forming the image on the recording paper S on the basis of the image information read from the original G will be described.

The recording paper S is fed from the first paper feed unit 30 while reading the second surface of the original G conveyed in the second original conveyance path 81 in the same manner as the procedure in the image forming operation described above, and is started to be conveyed by the conveyance rollers 40. Almost simultaneously, a latent image is formed on the photoconductive drum 10 on the basis of the image information described above by light from the light-emitting portion 21 on the basis of the information about the second surface of the original G stored in the memory of the image control unit C, the latent image is developed by the developing roller 11, and a toner image corresponding to the latent image is formed. Subsequently, the toner image is transferred to the recording paper S at the transfer roller 15, then the recording paper S is conveyed to the fixing unit 50 where the toner image is fixed, and the image formation corresponding to the second surface of the original G on the recording paper S is completed.

Although the feeding of the recording paper S is started simultaneously with the start of reading of the information on the second surface of the original G. However, the feeding of the recording paper S may be started after the reading of the information of the second surface is completed.

The recording paper S on which the image formation corresponding to the second surface of the original is completed is conveyed toward the duplex conveyance path 80 in which the direction of travel of the recording paper S is changed over by the flapper 61 by the reverse rotation of the discharge roller 60. As illustrated in FIG. 6, when the trailing edge of the original G passes therethrough, the flapper 82 switches the conveyance path so that the recording paper S switched back and conveyed in the duplex conveyance path 80 is conveyed toward the conveyance rollers 40.

Figure 7:
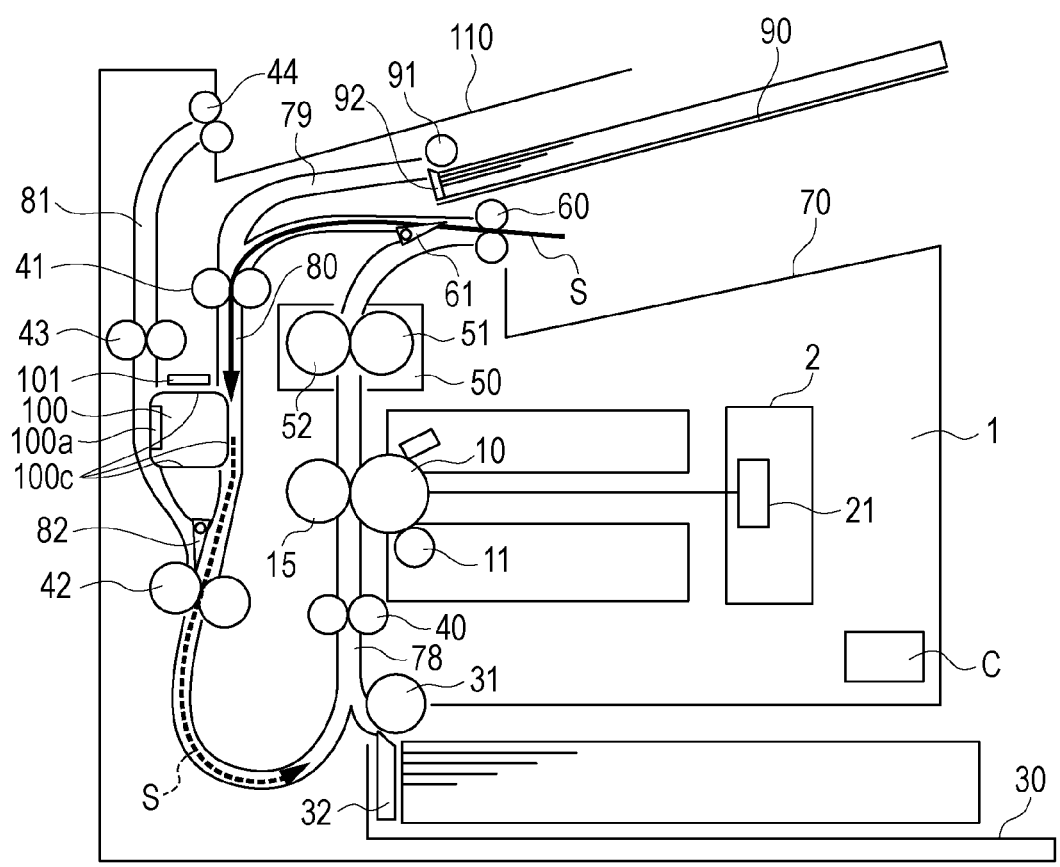
FIG. 7 is a schematic cross-sectional view of the image reading apparatus.

As illustrated in FIG. 7, the recording paper S is conveyed in the duplex conveyance path 80 by the conveyance rollers 41 and 42, and is conveyed to the transfer roller 15 again like the recording paper S indicated by a broken line. Then, the image corresponding to the first surface of the original G is transferred to the recording paper S on the basis of the image information of the first surface of the original G stored in the memory of the image control unit C described above, and the recording paper S passes through the fixing unit 50 and is discharged to the first paper discharge unit 70.

The guide portion 100c facing the duplex conveyance path 80 is provided so that the recording paper S to be conveyed in the duplex conveyance path 80 is conveyed smoothly in the duplex conveyance path 80 when the reading unit 100 is in the second position facing the second original conveyance path 81 or at the stand-by position. The guide portion 100c is also formed at a portion facing the second original conveyance path 81 when the reading unit 100 is at the stand-by position. By forming the guide portion 100c in this manner, the original G or the recording paper S may be smoothly conveyed in the duplex conveyance path 80 or the second original conveyance path 81 at the time other than the period when the original G is read by the reading unit 100.

Figure 10:
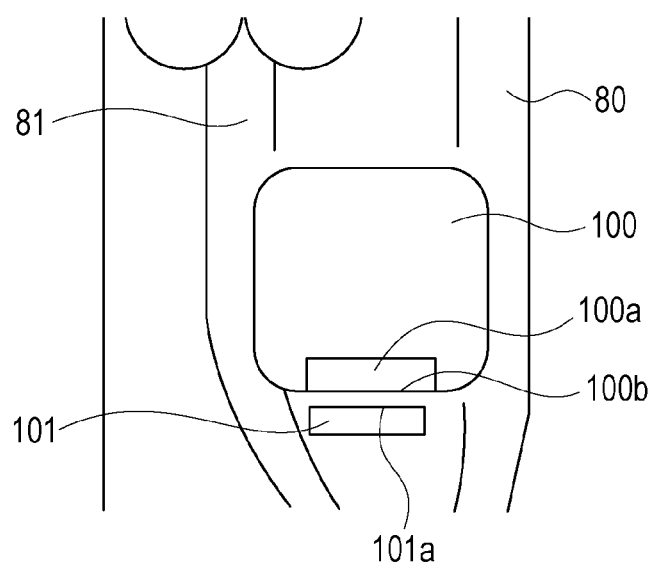
FIG. 10 is a schematic cross-sectional view of a portion near the reading unit of the image reading apparatus.

FIG. 10 is an enlarged view of a portion near the reading unit 100 of the image reading apparatus according to another embodiment. As illustrated in FIG. 10, it is also possible that the white reference member 101 is arranged so that the surface to be sensed 101a of the white reference member 101 facing upward in the vertical direction and the reading surface 100b face each other, and this position is set as the stand-by position of the reading unit 100.

As described above, according to the first embodiment, with a configuration in which the reading unit 100 can be movable to the first position facing the duplex conveyance path 80 and the second position facing the second original conveyance path 81, one of the both surfaces (the first surface and the second surface) of the original G may be read by the single reading unit 100.

In addition, the white reference member 101 is arranged at a position different from the position of the duplex conveyance path 80 and the second original conveyance path 81. In other words, the white reference member 101 is arranged at a position which allows the reading unit 100 to read the white reference member 101 when the reading unit 100 is positioned at the third position different from the first position and the second position. By arranging the white reference member 101 at such the positions, the white reference member 101 is prevented from coming into contact with the original G or the recording paper S conveyed in the duplex conveyance path 80 and the second original conveyance path 81, and scratches of the white reference member 101 or the soiling thereof by the adherence of the foreign substances may be reduced.

In the first embodiment, by setting the stand-by position (third position) between the first position and the second position, the white reference member 101 may be read while the reading unit 100 rotates about the axis X and moves from the first position to the second position or from the first position to the second position, the number of times of reading of the white reference member 101 can be increased. Accordingly, the information relating to the image of the original may be corrected on the basis of the latest white reference information sequentially.

It is also possible to read the original G at the first position after the white reference information is read at the stand-by position, then read the white reference information at the stand-by position again before moving to the second position, and then compare the white reference information before and after the original image reading at the first position. Accordingly, it is possible to detect adherence of soiling at the reading unit 100 which is caused by the original G passing the position facing the reading unit 100. Furthermore cleaning or replacement of the reading unit 100 may be encouraged according to the result of detection.

In the first embodiment, since the white reference member 101 is arranged so that the surface to be sensed 101a of the white reference member 101 faces vertically downward as illustrated in FIG. 9, the probability of adherence of the foreign substances to the surface to be sensed 101a is reduced.

Although the image forming device of the first embodiment is the image forming device of an electrophotographic system, the invention may be applied to apparatuses having the image forming devices of other recording systems such as an ink jet system.

Second Embodiment

Subsequently, a second embodiment of the invention will be described. The second embodiment is different from the first embodiment in that the image reading apparatus 1 includes a cleaning device for the reading unit 100 and other configurations and operations are the same as those in the first embodiment. In this manner, the same parts as the first embodiment are designated by the same reference numerals and the description will be omitted.

Figure 8:
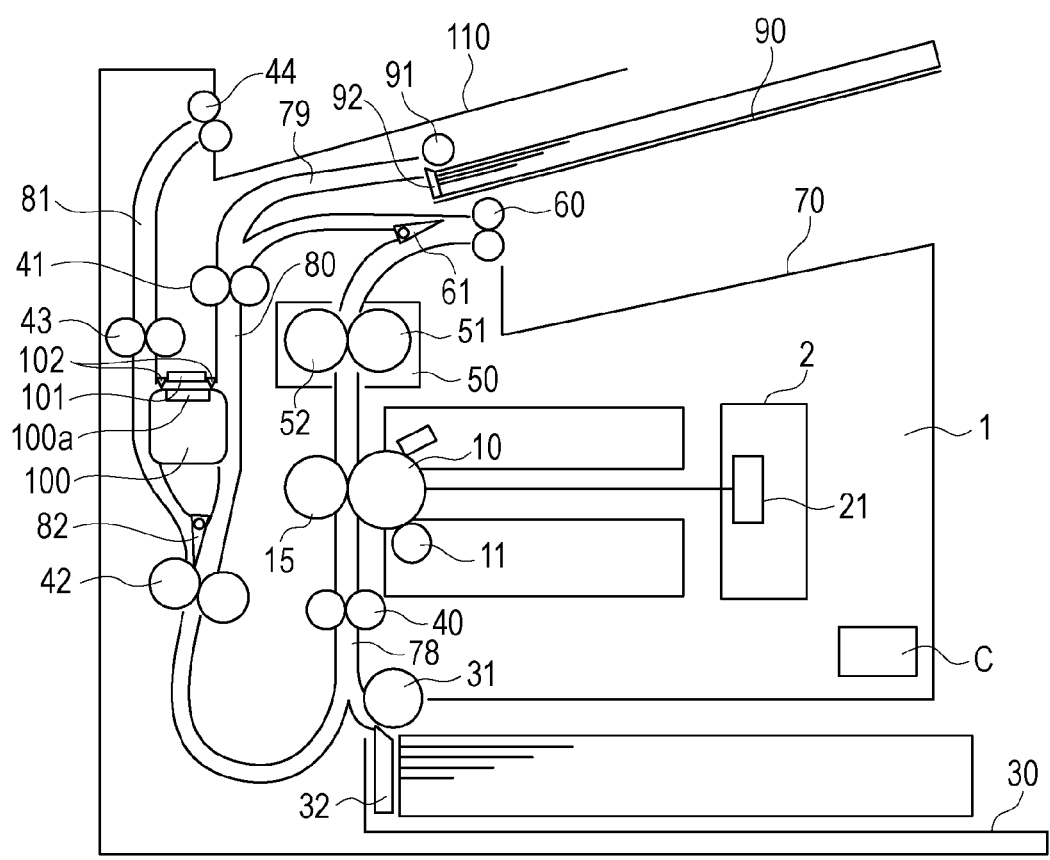
FIG. 8 is a schematic cross-sectional view of the image reading apparatus.

FIG. 8 is a schematic cross-sectional view of the image reading apparatus 1 according to the second embodiment. In the second embodiment, a cleaning blade 102 as the cleaning device configured to clean by removing foreign substances on the reading surface 100b is provided so as to be in contact with the reading surface 100b. The cleaning blade 102 is arranged between the reference member 101 and the duplex conveyance path 80, and between the white reference member 101 and the second original conveyance path 81. In other words, the cleaning blade 102 is arranged so as to come into contact with the reading unit 100 between the first position and the third position, and between the second position and the third position.

Therefore, the reading surface 100b and the guide portion 100c come into contact with the cleaning blade 102 by the rotation of the reading unit 100 as described in the first embodiment to remove and clean foreign substances such as paper dust or soiling on the surface of the reading surface 100b. Since the gap between the white reference member 101 and the reading unit 100 formed in the duplex conveyance path 80 and the second original conveyance path 81 can be closed by the reading unit 100 and the cleaning blade 102, an effect of preventing the foreign substances or the soiling from entering the gap is also expected.

As the cleaning device, a brush and a non-woven fabric are also applicable in addition to the blade-shaped cleaning blade 102, and alternatively, different types of cleaning devices described above may be used as the cleaning device between the white reference member 101 and the duplex conveyance path 80 and the cleaning device between the white reference member 101 and the second original conveyance path 81.

In this manner according to the second embodiment, the same effects and advantages as those in the first embodiment are achieved. In addition, the cleaning device is arranged so as to clean the reading unit 100 between the first position and the third position, and between the second position and the third position. Therefore, the reading unit 100 can be cleaned when the reading unit 100 is moved between the first position and the second position. In addition, since the reading unit 100 is always cleaned before the reading unit 100 moves to the third position facing the white reference member 101, adherence of the soiling adhered to the reading unit 100 is prevented from being adhered to the white reference member 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105895, filed May 7, 2012, which is hereby incorporated by reference herein in its entirety.

What is claimed is:

1. A reading apparatus comprising:
    a first conveyance path in which a sheet is conveyed;
    a second conveyance path different from the first conveyance path, the second conveyance path allowing the sheet switched back after having passed through the first conveyance path to be conveyed therein;
    a reading unit configured to read the sheet, the reading unit being movable to a first position where a first surface of the sheet in the first conveyance path is read, a second position where a second surface as a back surface of the first surface of the sheet in the second conveyance path is read, and a third position different from the first position and the second position; and
    a reference portion that the reading unit reads for correcting information read by the reading unit, the reference portion being read by the reading unit moved to the third position.

2. The reading apparatus according to claim 1, wherein the image reading unit passes through the third position while moving from the first position to the second position.

3. The reading apparatus according to claim 1, wherein the reference portion includes a surface to be sensed that the reading unit reads, and the surface to be sensed is arranged so as to face downward in the vertical direction.

4. The reading apparatus according to claim 1, further comprising:
    a cleaning device configured to clean the reading unit, the cleaning device cleaning the reading unit moving between the first position and the second position.

5. The reading apparatus according to claim 1, further comprising:
    a cleaning device configured to clean the reading unit, the cleaning device cleaning the reading unit moving between the first position and the third position.

6. The reading apparatus according to claim 1, wherein the reading unit includes a guide portion configured to guide conveyance of a sheet conveyed in the second conveyance path when the reading unit is at the first position or the third position.

7. The reading apparatus according to claim 1, further comprising:
    an image forming device configured to form an image on another sheet different from the sheet read by the reading unit on the basis of the information read by the reading unit.

8. The reading apparatus according to claim 7, wherein the image forming device includes a conveyance path for conveying the another sheet after having formed an image on the first surface to the image forming device again in order to form an image on the second surface of the another sheet, and part of the conveyance path corresponds to the first conveyance path.

9. The reading apparatus according to claim 1, wherein the reading unit is capable of reading an image of the first surface of the sheet in the first conveyance path and an image of the second surface of the sheet in the second conveyance path.

10. A reading apparatus comprising:
    a reading unit configured to be movable to a first position where a first surface of a sheet is read, a second position where a second surface as a back surface of the first surface of the sheet is read, and a third position different from the first position and the second position; and
    a surface to be sensed read by the reading unit for correcting information read by the reading unit, the surface to be sensed being arranged so as to face downward in the vertical direction, and the surface to be sensed is read by the reading unit moved to the third position.

11. The reading apparatus according to claim 10, wherein the reading unit passes through the third position while moving from the first position to the second position.

12. The reading apparatus according to claim 10, further comprising:
    a cleaning device configured to clean the reading unit, the cleaning device cleaning the reading unit moving between the first position and the second position.

13. The reading apparatus according to claim 10, further comprising:
    a cleaning device configured to clean the reading unit, the cleaning device cleaning the reading unit moving between the first position and the third position.

14. The reading apparatus according to claim 10, wherein the reading unit includes a guide portion configured to guide conveyance of a sheet conveyed in the second conveyance path when the reading unit is at the first position or the third position.

15. The reading apparatus according to claim 10, further comprising:
    an image forming device configured to form an image on another sheet different from the sheet read by the reading unit on the basis of the information read by the reading unit.

16. The reading apparatus according to claim 15, wherein the image forming device includes a conveyance path for conveying the another sheet after having formed an image on the first surface of the another sheet to the image forming device again in order to form an image on the second surface of the another sheet, and part of the conveyance path corresponds to the first conveyance path.

17. The reading apparatus according to claim 10, wherein the reading unit is capable of reading an image of the first surface of the sheet in the first conveyance path and an image of the second surface of the sheet in the second conveyance path.

* * * * *